US010089153B2

(12) United States Patent
Rajagopalan et al.

(10) Patent No.: US 10,089,153 B2
(45) Date of Patent: *Oct. 2, 2018

(54) SYNCHRONIZING LOAD BALANCING STATE INFORMATION (71) Applicant: Avi Networks, Santa Clara, CA (US)

(72) Inventors: Ranganathan Rajagopalan, Fremont, CA (US); Murali Basavaiah, Sunnyvale, CA (US); Kiron Haltore, San Jose, CA (US); Anand Parthasarthy, Fremont, CA (US); Abhijeet Joglekar, Sunnyvale, CA (US)

(73) Assignee: Avi Networks, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/199,512

(22) Filed: Jun. 30, 2016

(65) Prior Publication Data
US 2017/0031725 A1    Feb. 2, 2017

Related U.S. Application Data (63) Continuation of application No. 14/092,640, filed on Nov. 27, 2013, now Pat. No. 9,407,692.

(51) Int. Cl.
G06F 9/46       (2006.01)
G06F 9/50       (2006.01)
H04L 29/08      (2006.01)
G06F 9/455      (2018.01)
G06F 9/52       (2006.01)

(52) U.S. Cl.
CPC ........ G06F 9/5083 (2013.01); G06F 9/45558 (2013.01); G06F 9/52 (2013.01); H04L 67/1014 (2013.01); H04L 67/2842 (2013.01); G06F 2009/4557 (2013.01); G06F 2009/45595 (2013.01)

(58) Field of Classification Search
None
See application file for complete search history.

(56) References Cited

U.S. PATENT DOCUMENTS

| 2012/0117621 A1* | 5/2012 | Kondamuru ...... H04L 29/12066 726/3 |
| 2012/0155266 A1* | 6/2012 | Patel ..................... H04L 47/125 370/235 |
| 2014/0040551 A1* | 2/2014 | Blainey ............... G06F 12/0833 711/122 |

* cited by examiner

Primary Examiner — Wissam Rashid
(74) Attorney, Agent, or Firm — Van Pelt, Yi & James LLP (57) ABSTRACT Load balancing includes receiving, from a client, a connection request to establish a connection with a server; determining load balancing state information based at least in part on the connection request; synchronizing the load balancing state information across a plurality of service engines using a distributed data store service, the distributed data store service being configured to: determine whether in a distributed data store there is an existing entry that corresponds to the load balancing state information; in the event that it is determined that in the distributed data store there is no existing entry that corresponds to the load balancing state information, atomically create a new entry based on the load balancing state information; and distributing the connection to a selected server among a plurality of servers, the selected server being selected based at least in part on the load balancing state information.

23 Claims, 8 Drawing Sheets

SYNCHRONIZING LOAD BALANCING STATE INFORMATION

CROSS REFERENCE TO OTHER APPLICATIONS

This application is a continuation of co-pending U.S. patent application Ser. No. 14/092,640, entitled METHOD AND SYSTEM FOR DISTRIBUTED LOAD BALANCING filed Nov. 27, 2013 which is incorporated herein by reference in its entirety for all purposes.

BACKGROUND OF THE INVENTION

Data centers typically operate a great number of servers. Currently, a centralized architecture is commonly used, where a central load balancer is used to direct connections to these servers according to load balancing algorithms designed to evenly distribute networking and computing resources. Data management is relatively straightforward since all necessary data (such as session information) is kept by the central load balancer. The centralized architecture has some performance limitations. For example, using a central load balancer can result in a single point of failure within the system, as well as create a network bottleneck.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed load balancer is disclosed. In some embodiments, the distributed load balancer includes a plurality of service engines configured to provide load balancing functions. A service engine is configured to execute on one or more computer processors, communicate with a plurality of clients, and distribute connections from the clients among a plurality servers. Load balancing state information such as connection and/or server related information is synchronized across the plurality of service engines using a distributed data store service that supports an atomic read-miss-create (RMC) function.

Figure 1:
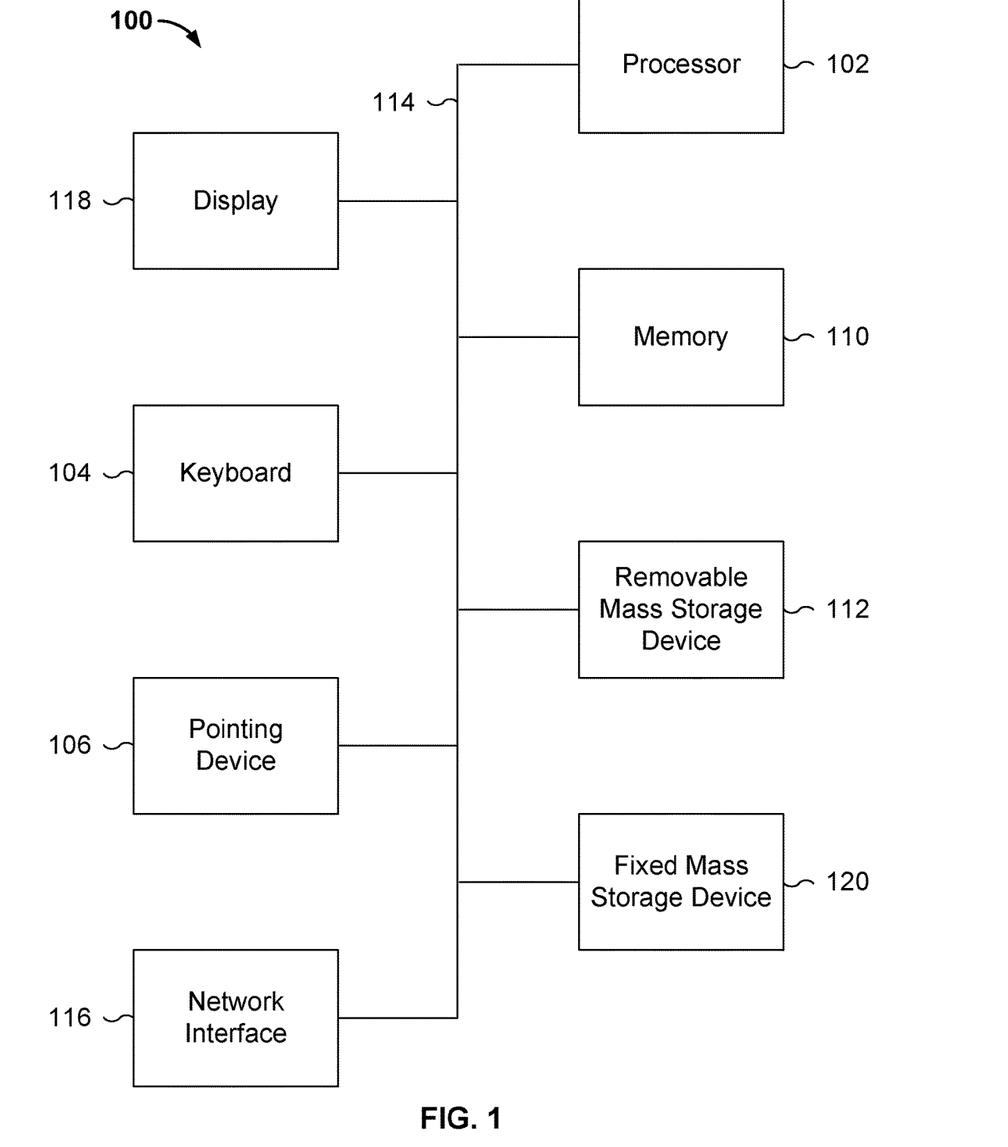
FIG. 1 is a functional diagram illustrating a programmed computer system for performing distributed load balancing in accordance with some embodiments.

FIG. 1 is a functional diagram illustrating a programmed computer system for performing distributed load balancing in accordance with some embodiments. As will be apparent, other computer system architectures and configurations can be used to perform distributed load balancing functions. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, processor 102 controls the reception and manipulation of input data, and the output and display of data on output devices (e.g., display 118). In various embodiments, processor 102 supports standard operating systems as well as virtual machine (VM)-based operating systems. In some embodiments, processor 102 includes and/or is used to implement one or more service engines and/or servers as discussed below, as well as to execute/perform the various processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
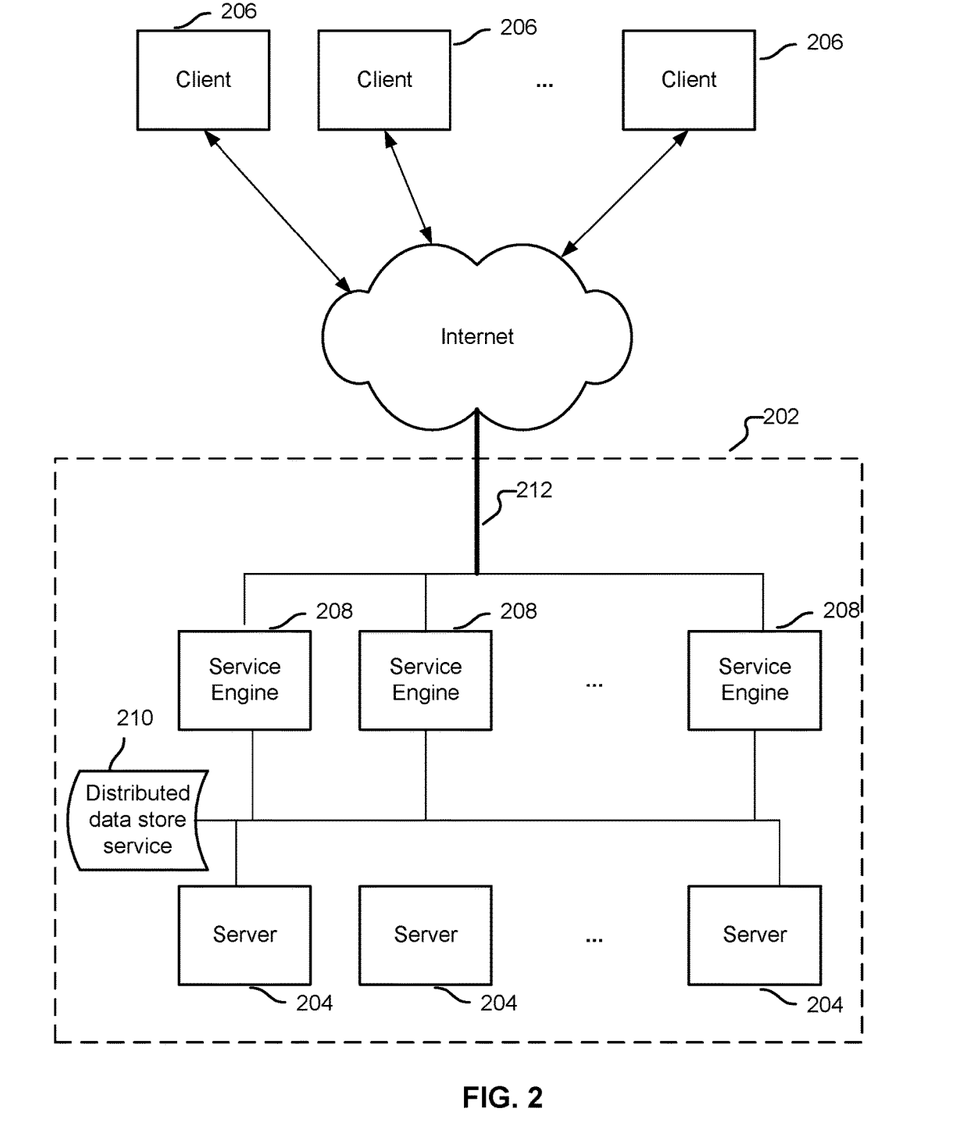
FIG. 2 is a block diagram illustrating an embodiment of a distributed load balancer.

FIG. 2 is a block diagram illustrating an embodiment of a distributed load balancer. In the example shown, client devices 206 can be computers, tablets, smartphones, or any other appropriate devices. Platform 202 can be within a data center network or other service provider network. A number of servers 204 are configured to provide network-based applications and services to the clients. In some embodiments, each server is implemented on a separate physical device. In some embodiments, multiple servers share the same physical device. In the example shown, separate physical devices communicate via communications interfaces such as buses, cables, optical or wireless interfaces, etc. In some embodiments, the servers operate within standard operating systems (e.g., Linux™, Windows™, etc.) on physical devices; in some embodiments, the servers operate within operating systems on virtual machines (VMs) (e.g., virtual machines supported by a hypervisor). Clients 206 establish connections with servers 204 to gain access to the applications and services.

In the example shown, the load balancer includes a plurality of service engines 208. Each service engine may be implemented on a physical device or a virtual machine; multiple service engines may execute on separate physical devices or share the same physical device. Each service engine implements distributed load balancing functions, which can be implemented in software code, in hardware (e.g., using application specific integrated circuits (ASIC)), or a combination. The initial connection request from a client 206 can be received by any service engine 208. To evenly distribute resources, each service engine 208 performs load balancing functions to direct the connection to a selected one of the servers based on a load balancing algorithm. A variety of load balancing algorithms may be implemented using known techniques. As will be described in greater detail below, service engines 208 cooperate to function as a single load balancer to distribute connections received on network 212 to servers 204.

Service engines 208 need certain information, referred to as load balancing state information, to provide load balancing functions. Such load balancing state information should be globally visible to all the service engines and constantly updated. In some cases, the load balancing state information can be used as inputs to certain load balancing algorithms. A few examples of load balancing state information include:

1) Health information of the servers. In some embodiments, a monitoring process periodically checks with the servers to determine whether any of them has failed. The obtained health information is used by the service engines to include healthy servers and exclude failed servers for load balancing purposes.

2) Session information, such as secure socket layer (SSL) or transport layer security (TLS) session information. A set of related data exchanges between a client and one or more server applications is referred to as a session. For example, when a user uses a browser application on a client device to access a secure e-commerce application on a server to purchase a product, the set of secure transaction-related data exchanges is conducted within a SSL or TLS session. While multiple servers can provide the same service to a client, a session is preferably conducted between one client and one server. A SSL/TLS session is first established after a set of handshakes between the client and the server. Session information such as IP address and encryption parameters (e.g., session key, master key, etc.) is generated. Establishing the secure session is computationally expensive since the process requires multiple steps of encryption and decryption; thus, for efficiency reasons, the same secure session is sometimes maintained to handle multiple connections from the same client. In other words, if a client first establishes a SSL/TLS session with a website with a first connection request, and shortly thereafter returns to the website with a second connection request, the same secure session is maintained for the first and the second connections. In some embodiments, a SSL/TLS table that maps a session ID and session parameters is used to maintain SSL/TLS session information.

3) Persistence information. Once a session is established, subsequent data packets sent by the client on the same session should be directed to the same server in a persistent manner. As used herein, a session can be a secure session such as a SSL/TLS session, as well as an application session specified by the server application (e.g., a log on session with specific exchanges). In some stateful persistence schemes such as source Internet Protocol (IP) address based persistence, a mapping table or the like is used to track persistence information such as the mapping relationships between source IP addresses and corresponding load balanced servers used to service the session. In other schemes such as application based persistence, the persistence information further includes a mapping table of application/session identifiers (or other session identifying information) and corresponding load balanced servers. For purposes of illustration, examples involving the source IP address based scheme are discussed in more detail below; however, other schemes/mapping tables can also be used.

4) Client/server connection information such as the number of connections from a given client, the number of connections being handled by a server, etc.

5) Connection limitation information such as the maximum number of connections a server, a client, the load balancer as a whole is permitted or capable of handling, etc.

6) Load balancing measurements such as how much load each server has based on number of connections, response time, latency, etc. Many other types of load balancing states are possible.

Many other types of load balancing state information can be used. Depending on implementation, different types of load balancing state information can be stored in different data store/data structures or a unified data store/data structure.

In the example shown, a distributed data store service 210 is used to synchronize load balancing state information across service engines 208 and facilitate cooperation among the service engines. Specifically, distributed data store service 210 supports an atomic read-miss-create (RMC) function. As will be described in greater detail, in various embodiments, distributed data store service 210 is implemented using one or more databases, a distributed protocol, and/or other appropriate techniques. In some embodiments, distributed data store service 210 supplies a set of application programming interfaces (APIs) so that the same services (functions) are provided to the service engines regardless of the underlying mechanisms used to implement the service.

Figure 3:
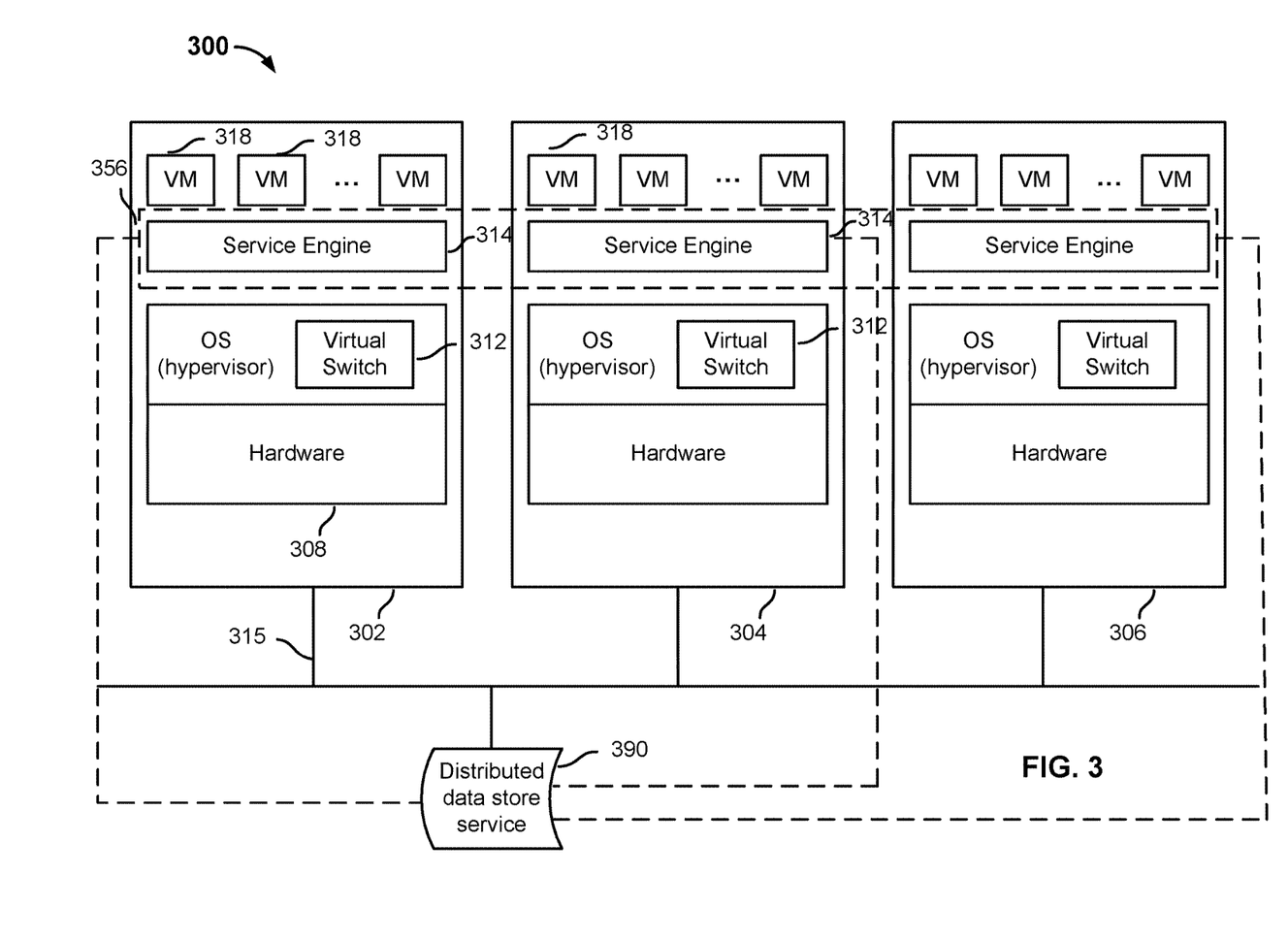
FIG. 3 is a block diagram illustrating an embodiment of a virtualized distributed load balancer.

FIG. 3 is a block diagram illustrating an embodiment of a virtualized distributed load balancer. In this example, platform 300 includes a number of devices (e.g., multiple server computers or a multicore server comprising multiple processing cores). A physical device (e.g., 302, 304, 306, etc.) has hardware components and software components, and may be implemented using a device such as 100. In particular, hardware of the device supports operating system software in which a number of virtual machines (VMs) 318 are configured to execute. A VM is a software implementation of a machine (e.g., a computer) that simulates the way a physical machine executes programs. The part of the device's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In this example, clients (not shown) communicate with servers, which are configured as VMs executing instances of network applications. Examples of such network applications include web applications such as web applications, shopping cart, user authentication, credit card authentication, email, file sharing, virtual desktops, voice/video streaming, online collaboration, etc. Many other network applications can be implemented. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. A network service layer providing load balancing functions is described in detail below. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch 312. A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines 314 are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. In some embodiments, a load balancer component is executed within a service engine to provide load balancing logic, specifically to distribute traffic load amongst instances of target applications executing on the local physical device as well as other physical devices. In some embodiments, other types of service components such as firewall may be implemented and enabled as appropriate. When a specific service is desired, a corresponding service component is configured and invoked by the service engine to execute in a VM. A distributed load balancer comprising multiple load balancer components is described in detail below.

A virtual switch such as 312 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). In some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application executes. In some embodiments, a service engine sends data to and receives data from a target application via the virtual switch.

In some embodiments, a controller (not shown) is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof.

In the example shown, a distributed data store service 390 is used to store data and facilitate the synchronization of load balancing state information across service engines. The service engines and the distributed data store service cooperate to function as a single entity, forming a distributed network service layer 356 to provide services to the target applications. In other words, although multiple service engines 314 are installed and running on multiple physical devices, they cooperate to act as a single layer 356 across these physical devices. In some embodiments, the service engines cooperate by sharing state information (e.g., load balancing state information) using distributed data store service 390.

In some embodiments, a single service layer is presented to the target applications to provide the target applications with services. The interaction between the target applications and service layer is transparent in some cases. In this example, a load balancing service is provided by the service layer, and the target application sends and receives data via existing APIs as it would with a standard, non-distributed load balancing device. In other words, from the perspectives of a client or a server-side application targeted by the client, it is as if a single service layer object (specifically, a single load balancer) were instantiated and with which the client or target application communicated, even though in some implementations multiple service engine objects (with multiple load balancing components) execute on multiple devices.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine (in particular the load balancing component within the service engine) performs load balancing functions. Specifically, based on load balancing factors such as configured rules and operating conditions, the service engine redirects the traffic to an appropriate target application executing in a VM on a server.

Figure 4:
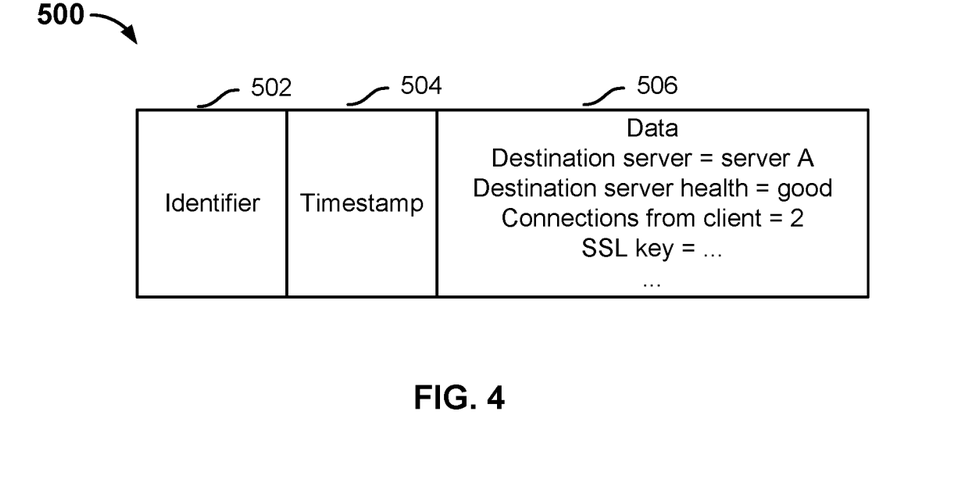
FIG. 4 is a data structure diagram illustrating an embodiment of an entry used to store load balancing state information.

In some embodiments, the distributed data store service stores the load balancing state information as entries in a table, a database, or other searchable form. FIG. 4 is a data structure diagram illustrating an embodiment of an entry used to store load balancing state information. Depending on the distributed data store service implementation, the entry can be stored in an external database and/or a local cache of the service engine. Entry 500 includes an identifier portion 502, a timestamp portion 504, and a data portion 506. Entry 500 is shown for purposes of example, and many different data structures such as entries comprising different fields can be used.

In this example, the entry is looked up by the distributed data store service using the identifier. In this example, identifier 502 includes the source IP address of a connection. Other types of identifiers can be used in other embodiments. For example, in some embodiments, identifier 502 includes a 5-tuple extracted from the header of a packet and includes the source IP address, the destination IP address, the source port number, the destination port number, and the protocol in use. In some embodiments, other appropriate data such as session identifier, application instance identifier, media access control (MAC) address, load balancer identifier, backend/destination server IP address, etc., can also be used.

In the example shown, an entry is valid for a preset period of time (e.g., 30 minutes), and timestamp portion 504 is used to track of when the entry is created thereby facilitating the determination of whether the entry is valid. When an entry is to be updated, the current time is compared with the timestamp to determine whether the entry is still valid. An invalid entry may be removed or replaced depending on implementation. In some embodiments, invalid (expired) entries are periodically removed from the data store. In some embodiments, appropriate fields in a valid entry are updated, and the timestamp is overwritten by the current time to extend the life of the entry.

Data portion 506 includes one or more fields that correspond to different types of state information, such as server health information, persistence information associated with the connection, session information (e.g., SSL/TSL information), client/server connection information, connection limitation information, load balancing measurements, etc. In some embodiments, field identification bits are preconfigured to indicate the type of state information to which a particular field corresponds. In some embodiments, different types of entries including different fields are specified.

Figure 5:
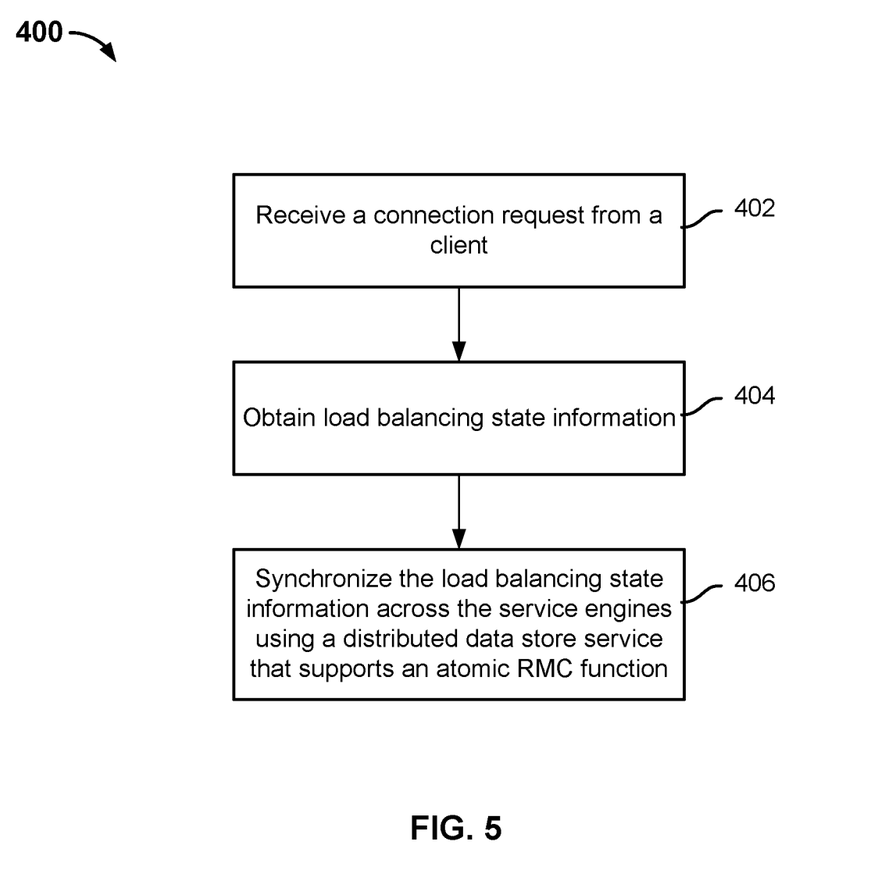
FIG. 5 is a flowchart illustrating an embodiment of a process for performing distributed load balancing.

FIG. 5 is a flowchart illustrating an embodiment of a process for performing distributed load balancing. In some embodiments, process 400 is performed by a service engine such as 208 of FIG. 2 or 314 of FIG. 3.

At 402, communication with clients (e.g., 206 of FIG. 2) takes place. In this example, a connection request to establish a connection with a server is received from a client. Depending on the application and the protocol used, the connection request can take on a variety of forms. For example, a web browser client can fetch a webpage or other resource from a web server; an email client can connect to an email server to send/receive emails; a file sharing client can connect to a file sharing server to share files; a collaboration client can connect to a collaboration server to collaborate on documents, etc. A new connection can be identified according to the protocol. For example, the client sends a SYN packet to establish a new TCP connection.

At 404, load balancing state information is obtained based on the connection request. The obtained load balancing state information can include one or more portions or all of the information included in a load balancing state entry such as 500.

In some embodiments, the load balancing state information includes information about the connection, such as the connection's identification information. For purposes of illustration, the examples below use the source IP address as the identifier of the connection; other types of identification information (e.g., session or application identifier, 5-tuples, etc.) can be used.

In some embodiments, as discussed above in connection with FIG. 2, load balancing state information can also include load balancing support information, such as health information of the servers, persistence information, session information, client/server connection information, connection limitation information, load balancing measurements, etc. The support information can be used by the load balancing algorithm to make load balancing decisions. In some embodiments, the support information is maintained by functions/components implemented within the load balancer. For example, a health monitoring component within the load balancer determines the health of the backend servers and maintains the health information; a measurement component measures the number of connections and amount of traffic per connection, etc. In various embodiments, the relevant components can push the state information to the service engine, and the service engine can pull the state information from the relevant components.

In some embodiments, the load balancing state information includes which server should service the connection, which is determined based at least in part on the load balancing algorithm employed by the load balancing component of the service engine, and the operating conditions. For example, a round-robin scheme is used in some embodiments in which servers are arranged and selected to service connections according to a predefined order; a least-load scheme is used in some embodiments to select the server with the least number of connections or the least amount of traffic. Many other load balancing algorithms can be used. In some embodiments, the server can be a physical device executing a server application. In some embodiments, the server can include a VM (e.g., 318 of FIG. 3) on which a certain target server application (e.g., a shopping cart application, a log in application, etc.) executes.

In some embodiments, the determination of supporting information and/or the load balancing server selected to service the connection can be determined later, once it is determined that a new load balancing state entry should be created.

At 406, the obtained load balancing state information is synchronized across the plurality of service engines using a distributed data store service that supports an atomic read-miss-create (RMC) function. As will be described in greater detail below, there are different ways to implement the distributed data store service. The RMC function can be implemented using one or more function calls, methods, routines, procedures, instructions, or other forms of program code. In some embodiments, the distributed data store service provides a set of APIs associated with the RMC function so that synchronizing the load balancing state information includes invoking the appropriate API associated with the RMC function. Accordingly, the service engine handles the distributed data store service in the same way regardless of the underlying implementation. The parameters of the API are based at least in part on the load balancing state information. One example API is the following:

Value rmc_persistence(Key key_params, Value input_value)

This API takes as inputs a Key ("key_params") corresponding to the specific client (e.g., its IP address) and a Value ("input_value") corresponding to the backend server that is selected by the caller, and invokes the RMC functionality. The function returns a "Value" parameter that is either the same "input_value" that is passed in if no entry corresponding to the client exists, or a different "value" if a corresponding entry exists already. In either case, the caller should use the returned "value" to access the appropriate backend server.

Once the RMC function is performed and a selected server is determined, the connection is distributed to the selected serer accordingly to establish the connection and service the client.

Figure 6:
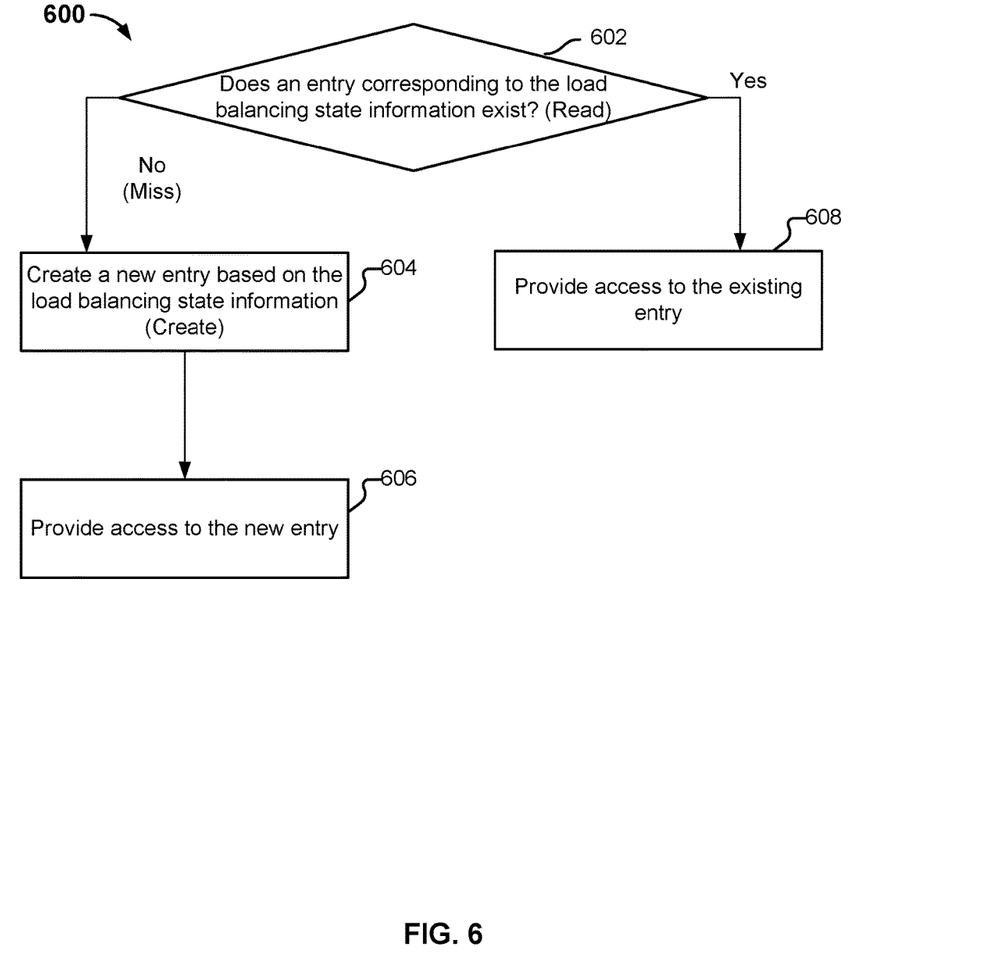
FIG. 6 is a flowchart illustrating an embodiment of a process for performing a RMC function.

FIG. 6 is a flowchart illustrating an embodiment of a process for performing a RMC function. Process 600 can be implemented by the distributed data store service in response to the invocation of the RMC API by the service engine to synchronize the load balancing state information. Process 600 can be invoked, for example, in connection with 404-406 of process 400, when a new connection is to be load balanced to an appropriate server.

At 602, it is determined whether an entry corresponding to the particular load balancing state information exists. Making the determination corresponds to the "read" portion of the RMC function. As will be described in greater detail below, in various embodiments, the determination is made by making a read request to an external database (also referred to as a master database) or using a distributed protocol to query an underlying storage. The distributed data store service can directly make the determination, or the service engine can ask the distributed data store service to make the determination and return the service engine with a result. In some embodiments, a load balancing state information table is maintained, in which entries are identified (e.g., indexed) by a set of identification information. In this example, when a new connection request from the source IP address of 123.4.5.6 needs to be load balanced by a server, the service engine requests the distributed data store service to check the load balancing state information table to determine whether another entry of a connection from the same source IP address already exists in the table.

In the event that it is determined that the entry does not already exist (the "miss" portion of RMC), at 604, a new entry is created based on the obtained load balancing state information (the "create" portion of RMC). The distributed data store service can directly create the new entry, or the service engine can request the distributed data store to create the new entry. In some embodiments, the load balancing algorithm is also applied to select a server, and the server information is added to the new entry; in some embodiments, the load balancing algorithm is applied and the new entry is updated at a later time. Continuing with the previous example, when no entry is found, a new entry with an ID/source IP address of 123.4.5.6 is created and added to the table. At 606, access to the new entry is provided. In various embodiments, an identifier, a reference, a pointer, an address, a handle, an index, or other information for locating the new entry in the table or otherwise accessing the new entry is provided for any additional processing.

If, however, an entry already exists, indicating that a connection from this source IP has already been load balanced and serviced by a server, then access to the existing entry is provided at 608. Continuing with the previous example, if a server with a specific tuple of IP address and port was previously selected by the load balancer to service a connection with the source IP address of 123.4.5.6, and a corresponding entry information has been stored in the table, then access to the existing entry is provided. In some embodiments, prior to 608, the existing entry's timestamp is checked. The entry is considered valid if the entry's timestamp indicates that the entry has not expired, and 608 is performed. If the entry's timestamp indicates that the entry has expired, in some embodiments, the timestamp is updated with the current time to extend the life of the entry; in some embodiments, the entry is deleted and control is returned to 602 so that another atomic RMC can be performed.

Once a new entry is created or if an existing entry is located, the service engines can access the corresponding load balancing state information and make load balancing decisions accordingly. In the case of a new entry, any additional load balancing state information that is needed is determined. For example, additional state information needed by the load balancing algorithm (also referred to as load balancing support information) such as server health and current load is gathered, and the load balancing algorithm is applied based on the state information to select a server to service the connection. In the case of an existing entry, the connection is load balanced to the existing server in the existing entry. In some embodiments, once the connection is successfully directed to the server, the new or existing entry is optionally updated using the load balancing state information. For example, the number of connections for the server can be incremented, and the health/latency information can be updated with the load balancing state information. In some embodiments, an entry is associated with a timestamp, and updating the existing entry includes updating the timestamp to the current time so that the entry's life is extended. Each field can be updated in a way that is appropriate for that field. Thus, the load balancing state information is said to be synchronized across the service engines.

The RMC function (602-604) of process 600 needs to be atomic to prevent conflicts, such as race conditions where multiple callers (e.g., service engines) are attempting to create multiple entries that correspond to the same connection. The atomic RMC process succeeds if there is no conflict. If there is a conflict caused by multiple callers attempting to create multiple entries that correspond to the same connection, only one of the callers will succeed in creating the entry while the other callers will fail. For example, suppose that two connection requests from the same source IP address are received at approximately the same time, causing process 600 to be invoked twice contemporaneously. Had the RMC steps not been atomic, a race condition may result where two separate new entries are created, each with a different server servicing connections from the same source IP address, which can lead to errors if specific data needs to be persisted on one server. For example, if two connections from the same client source IP address attempt to invoke the same shopping cart application, if due to the race condition two separate servers are selected to service the connection, each server may store different information about what is in the shopping cart and cause confusion. However, since 602-604 are implemented to be atomic, only one new entry will be successfully created. The caller that failed to create a new entry will be provided with access to the entry that was successfully created by the other caller, and subsequently use the load balancing server stored in that entry for servicing the connection. This way, only one server is used to service connections from this source IP address and consistency of data is maintained.

In some embodiments, the distributed data store service stores its data in a database that is external to the devices and utilizes database functions to provide atomic RMC support. This implementation is referred to as the external database implementation. The database can be a centralized database, an active-standby database (also known as a redundant database), a distributed active-active database, or any other appropriate type of database. The database implementation is transparent to the service engine since different types of databases typically implement the same database functions. In reference to process 600, to determine whether an entry corresponding to the load balancing state information exists (602), the external database is queried using a database query function. To create a new entry (604), a database create function is invoked. In some embodiments, atomicity is achieved by using a lock or other synchronization mechanisms. For example, a lock is acquired prior to 602 and released after 606 or 608. In some embodiments, atomicity is achieved by invoking an atomic RMC API that is supported by the database itself.

Figure 7:
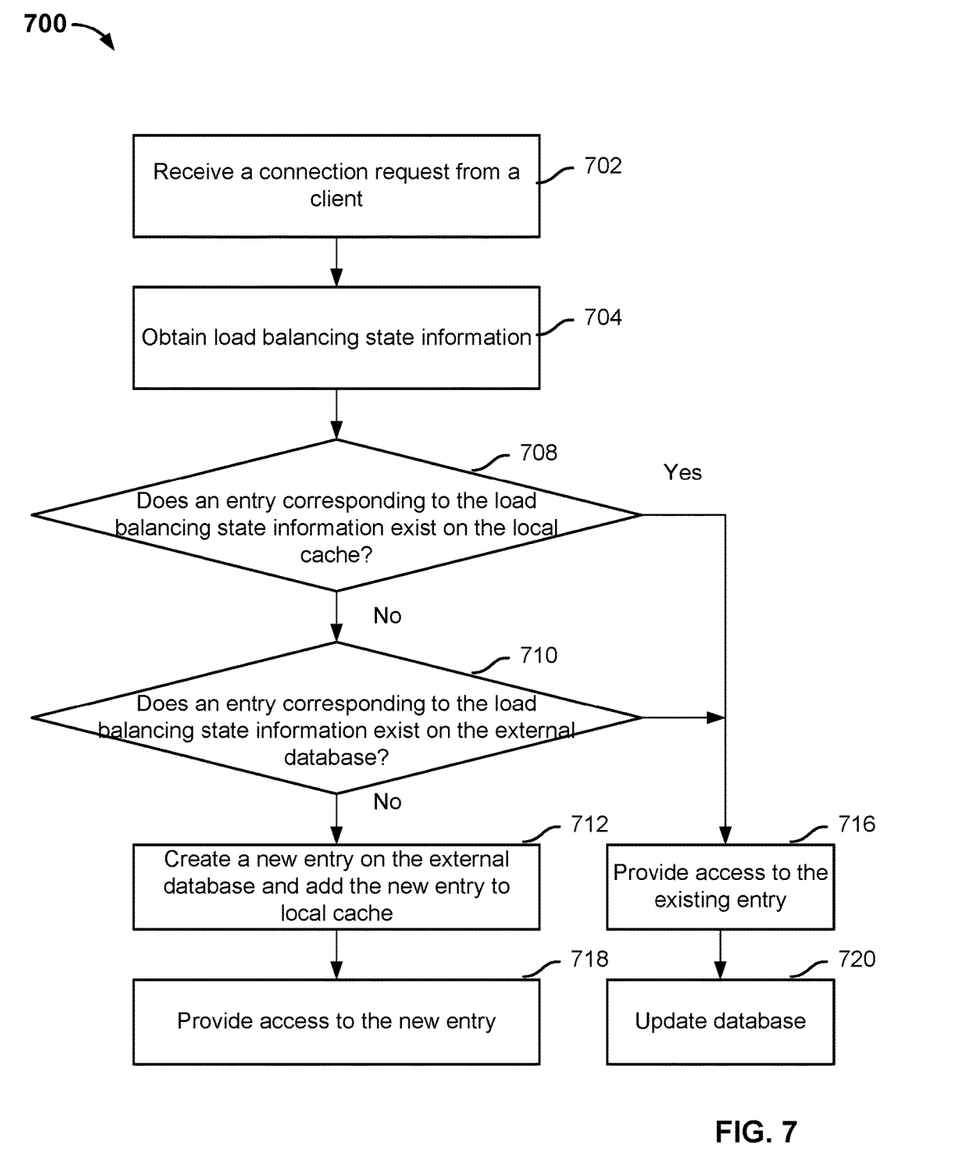
FIG. 7 is a flowchart illustrating an embodiment of a process for performing distributed load balancing using service engines with local caches.

In some embodiments, local caches are used to speed up the processing of load balancing state information. A local cache is a storage that is local to a corresponding service engine, such as an in-memory database on the same physical device or virtual machine as the service engine. The latency for a service engine to access its local cache is lower than the latency for the service engine to access the external database. Some but not necessarily all the data kept in the external database is replicated on the local cache. For example, some or all of the entries in a load balancing state information table can be replicated on the local cache and the external database. FIG. 7 is a flowchart illustrating an embodiment of a process for performing distributed load balancing using service engines with local caches. Process 700 can be performed by a service engine.

702-704 of process 700 are similar to 402-404 of process 400. Once load balancing state information is received at 704, to synchronize the load balancing state information, at 708, it is determined whether an entry that corresponds to connection exists on a local cache. In some embodiments, the entry is looked up in the local cache using identification information such as the source IP address. If the entry exists in the local cache, at 716, access to the existing entry (in this case, the existing entry in the local cache) is provided; otherwise, at 710, the external database is queried to determine whether an entry that corresponds to the load balancing state information exists therein. If the entry exists on the external database, the existing entry (in this case, the existing entry in the external database) is provided at 716. In some embodiments, prior to 716, the entry's timestamp is further examined to determine whether the entry is still valid. If the entry has expired, in some embodiments, the entry's timestamp is update (e.g., to current time) to extend the life of the entry; in some embodiments, the entry is deleted, and a notification of the deletion is sent to the other service engines for the service engines to delete the entry from their respective local caches. In the event the entry is deleted, control is transferred to 710 to re-check whether the entry exists in the database.

If no entry exists on the external database, at 712, a new entry is created on the external database based on the load balancing state information, and copies of the new entry are added to the local caches for quick lookups at a later time. Access to the new entry (either on the external database or the local cache) is provided at 718. At 720, the external database and the local cache are updated as appropriate. Certain load balancing state information such as the number of connections is updated. During this process, at least 710 and 712 are implemented as an atomic RMC function.

Similar to the above discussion in connection with process 600, once a new entry is created or an existing entry is allocated, the service engines can access the corresponding load balancing state information and make load balancing decisions accordingly. In some embodiments, once the connection is successfully directed to the server, the new or existing entry is optionally updated using the load balancing state information.

In some embodiments, the distributed data store service stores its data in local storages on the service engines. An external storage serving as the master database can be used but is not required. In such embodiments, the distributed data store service relies on a consensus-based distributed protocol to provide RMC support. This is referred to as the distributed protocol implementation. In some embodiments of systems that support a consensus-based distributed protocol, a set of nodes form a cluster. During a leader election phase, members of a cluster elect a node as the leader within the cluster. A number of leader election schemes may be implemented in various embodiments. For example, a leader may be elected as the member with the most recent update, or as the member with the highest MAC address. The remaining nodes are referred to as followers. All transactions are sent to the leader, which is responsible for executing the transaction and ensuring that state information is propagated to the followers. The leader and the followers maintain heartbeats with each other (e.g., the leader sends a heartbeat signal to each of the followers and vice versa.) In the event that the leader's heartbeat is lost, it is assumed that the leader has failed. Thus, a new leader election phase is initiated and a new leader is selected.

Figure 8:
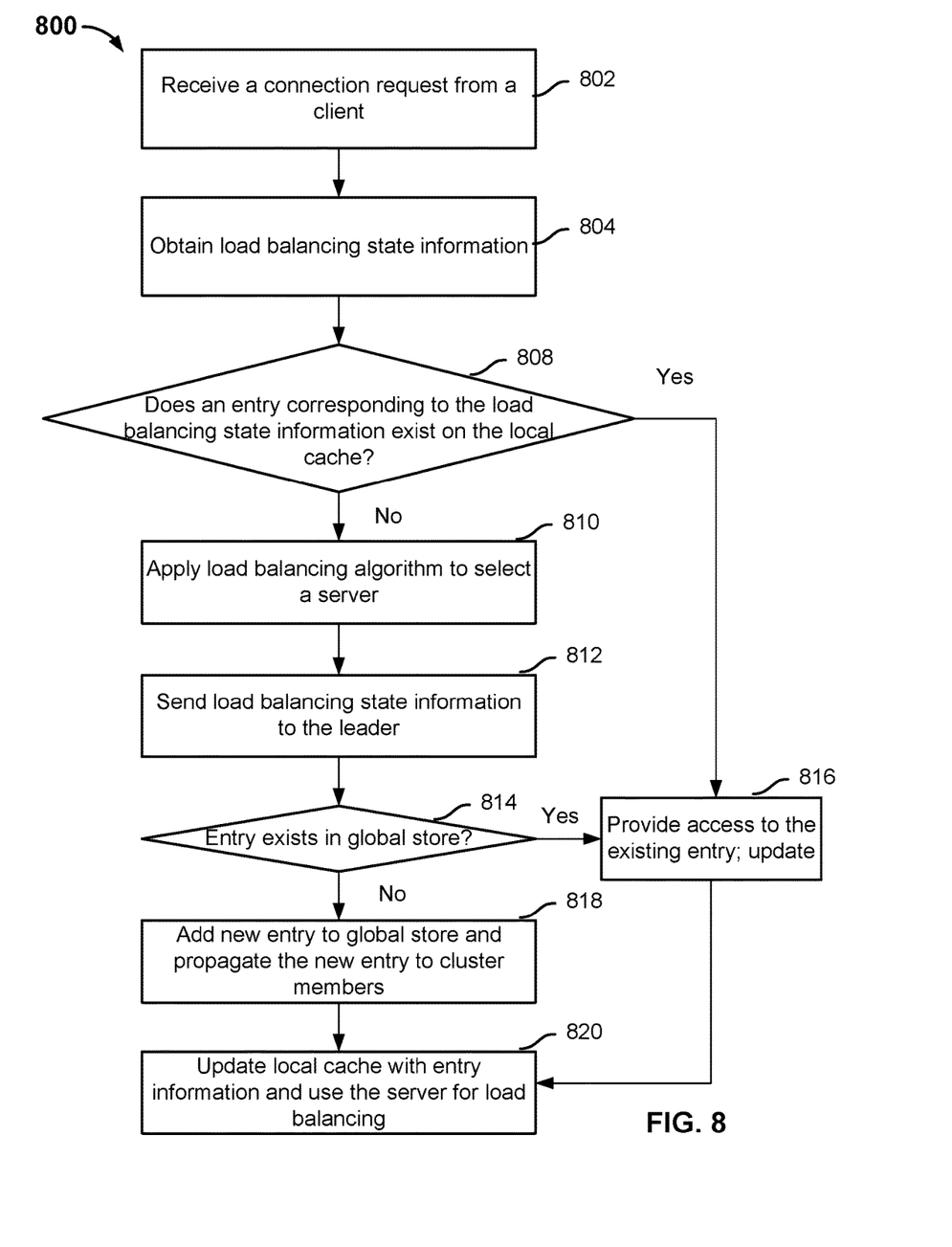
FIG. 8 is a flowchart illustrating an embodiment of a process for performing distributed load balancing using a consensus-based distributed protocol implementation.

Referring to the example systems of FIGS. 2 and 3, in a distributed protocol implementation, service engines acting as a single load balancer instance (e.g., 208 of FIG. 2 or 314 of FIG. 3) form a cluster. Initially, the service engines go through the leader election phase and elect a leader. Once the leader is elected, the service engines are ready to perform load balancing. FIG. 8 is a flowchart illustrating an embodiment of a process for performing distributed load balancing using a consensus-based distributed protocol implementation. In this example, each service engine maintains a local cache.

Process 800 assumes that a leader has been selected. 802-808 of process 800 are similar to 702-708 of process 700. Specifically, process 800 initiates at 802, when a connection request from a client is received by a receiving service engine. At 804, the receiving service engine obtains load balancing state information (e.g., identification information and/or additional load balancing support information) based on the connection. At 808, it is determined whether an entry corresponding to the load balancing state information exists in the local cache (e.g., local load balancing state table) of the receiving service engine. If so, at 816, access to the existing entry is provided and the previously selected server according to the existing entry is used to service the connection. The entry is also updated as appropriate (e.g., certain state information such as number of connections is updated).

If, however, no entry exists in the local cache, then any additional load balancing support information needed to perform load balancing (e.g., health status, number of connections, current load, etc.) is obtained, and the load balancing algorithm is applied based at least in part on the additional information to select a server at 810.

At 812, the receiving service engine sends the load balancing state information to the leader service engine. In some embodiments, an entry comprising such information is constructed and sent to the leader.

At 814, the leader looks up in a global store (e.g., a global load balancing state information table) using at least a portion of received load balancing state information. The leader maintains the global store for load balancing information, which can be implemented using an external data store or a data store local to the leader. In some embodiments, the local cache maintained by the leader is treated as the global store and no additional external data store is required. In some embodiments, the identifier in the received entry (e.g., source IP) is used as an index to perform the lookup. If a corresponding entry exists, then it is determined that a server has already been configured to service this connection. Thus, at 816, access to the existing entry is provided to the receiving service engine, which will send the connection to the previously selected server stored in the existing entry. In other words, for connections from the same source IP address, an existing load balancing decision previously made will override the new load balancing decision made by the receiving service engine. In some embodiments, prior to 816, the existing entry's timestamp is checked, and an expired entry is either updated with a new timestamp or deleted. In embodiments that the expired entry is deleted, a notification is sent for other service engines to update their caches accordingly, and control is transferred back to 814.

If there is no existing entry, at 818, the leader adds the new entry to the global persistence information data store, and propagates the entry to the cluster members so the cluster members can update their local caches. The leader further responds to the receiving service engine indicating that the new entry has been accepted and the new connection will be handled by the server selected by the receiving service engine. 814 and 818 are performed atomically to prevent the race conditions discussed above in connection with FIG. 6.

In some embodiments, at 816 and 818, the existing entry or the new entry is optionally updated. For example, the number of connections from the client is incremented; the load balancing measurements are updated, etc. If, however, no entry exists, the leader adds a new entry based on the persistence information to the global database, propagates the entry to all other follower-service engines in this load balancer so that the other follower-service engines can update their respective local caches, and responds to the receiving service engine.

Following 816 or 818, at 820, the receiving service engine updates its local cache with the existing entry information (found either in the receiving service engine's local cache or the leader service engine's global table) or the new entry information, and use the selected server according to the entry to service the connection.

Distributed load balancing has been described. Using multiple service engines to implement a distributed load balancer improves reliability and system throughput.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
synchronize load balancing state information across a plurality of service engines, the load balancing state information being associated with a connection, and to synchronize the load balancing state information including to cause a distributed data store service to:
determine in a distributed data store whether there is an existing entry that corresponds to the load balancing state information associated with the connection; and
in response to a determination that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection; and
distribute the connection to a selected server among a plurality of servers; wherein
the plurality of service engines are configured to operate within a plurality of virtual machines executing on one or more physical devices; and
a service engine among the plurality of service engines performs synchronizing the load balancing state information and distributing the connection to the selected server; and
one or more memories coupled with the one or more processors, configured to provide the one or more processors with instructions.

2. The system of claim 1, wherein:
in the event that there is no existing entry that corresponds to the load balancing state information associated with the connection, the one or more processors are further configured to update the new entry.

3. The system of claim 1, wherein:
in the event that there is an existing entry that corresponds to the load balancing state information associated with the connection:
the one or more processors are further configured to provide access to the existing entry; and
the selected server is selected based at least in part on the existing entry.

4. The system of claim 1, wherein the plurality of service engines are configured to operate within a plurality of virtual machines executing on one or more physical devices.

5. The system of claim 1, wherein the load balancing state information includes one or more of: health information of at least some of the plurality of servers, persistence information associated with at least some connections, session information, client/server connection information, connection limitation information, and/or load balancing measurement.

6. The system of claim 1, wherein the distributed data store service is implemented using a database that supports an atomic read-miss-create (RMC) function.

7. The system of claim 1, wherein in the event that in the distributed data store there is the existing entry that corresponds to the load balancing state information associated with the connection, the one or more processors are further configured to determine whether the existing entry has expired.

8. A system, comprising:
one or more processors configured to:
synchronize load balancing state information across a plurality of service engines, the load balancing state information being associated with a connection, and to synchronize the load balancing state information including to cause a distributed data store service to:
determine in a distributed data store whether there is an existing entry that corresponds to the load balancing state information associated with the connection; and
in response to a determination that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection;
distribute the connection to a selected server among a plurality of servers;
in the event that in the distributed data store there is the existing entry that corresponds to the load balancing state information associated with the connection, determine whether the existing entry has expired; and
in the event that the existing entry has expired, update a timestamp associated with the existing entry or to delete the existing entry.

9. The system of claim 1, wherein the one or more processors are further configured to:
check a local cache to determine whether there is an existing entry corresponding to the load balancing state information in the local cache; and
to determine whether in the distributed data store there is an existing entry that corresponds to the load balancing state information associated with the connection is performed in the event that there is no entry corresponding to the load balancing state information in the local cache.

10. The system of claim 1, wherein the distributed data store service is implemented using a consensus-based distributed protocol.

11. A system, comprising:
one or more processors configured to:
synchronize load balancing state information across a plurality of service engines, the load balancing state information being associated with a connection, and to synchronize the load balancing state information including to cause a distributed data store service to:
    determine in a distributed data store whether there is an existing entry that corresponds to the load balancing state information associated with the connection; and
    in the event that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection;
    distribute the connection to a selected server among a plurality of servers; and
    send the load balancing state information to a leader selected among a cluster comprising the plurality of service engines; wherein:
the distributed data store includes a global data store; and
to determine whether in the distributed data store there is an existing entry that corresponds to the load balancing state information associated with the connection is made according to the leader; and
in the event that there is no existing entry, the new entry is added to the global data store.

12. A method, comprising:
synchronizing load balancing state information across a plurality of service engines, the load balancing state information being associated with a connection, and the synchronizing of the load balancing state information including causing a distributed data store service to:
    determine in a distributed data store whether there is an existing entry that corresponds to the load balancing state information associated with the connection; and
    in response to a determination that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection; and
    distributing the connection to a selected server among a plurality of servers; wherein:
the plurality of service engines are configured to operate within a plurality of virtual machines executing on one or more physical devices; and
the synchronizing of the load balancing state information and the distributing of the connection to the selected server are performed by a service engine among the plurality of service engines.

13. The method of claim 12, further comprising: in the event that there is no existing entry that corresponds to the load balancing state information associated with the connection, updating the new entry.

14. The method of claim 12, wherein:
in the event that there is an existing entry that corresponds to the load balancing state information associated with the connection:
    the method further comprises providing access to the existing entry; and
    the selected server is selected based at least in part on the existing entry.

15. The method of claim 12, wherein the plurality of service engines are configured to operate within a plurality of virtual machines executing on one or more physical devices.

16. The method of claim 12, wherein the load balancing state information includes one or more of: health information of at least some of the plurality of servers, persistence information associated with at least some connections, session information, client/server connection information, connection limitation information, and/or load balancing measurement.

17. The method of claim 12, wherein the distributed data store service is implemented using a database that supports an atomic read-miss-create (RMC) function.

18. The method of claim 12, further comprising: in the event that in the distributed data store there is the existing entry that corresponds to the load balancing state information associated with the connection, determining whether the existing entry has expired.

19. A method, comprising:
synchronizing load balancing state information across a plurality of service engines, the load balancing state information being associated with a connection, and the synchronizing of the load balancing state information including causing a distributed data store service to:
    determine in a distributed data store whether there is an existing entry that corresponds to the load balancing state information associated with the connection; and
    in response to a determination that in the distributed data store there is the existing entry that corresponds to the load balancing state information associated with the connection, determining whether the existing entry has expired; and
    in response to a determination that the existing entry has expired, updating a timestamp associated with the existing entry or deleting the existing entry.

20. The method of claim 12, further comprising:
checking a local cache to determine whether there is an existing entry corresponding to the load balancing state information in the local cache; and wherein
the determining of whether in the distributed data store there is an existing entry that corresponds to the load balancing state information associated with the connection is performed in the event that there is no entry corresponding to the load balancing state information in the local cache.

21. The method of claim 12, wherein the distributed data store service is implemented using a consensus-based distributed protocol.

22. A method, comprising:
synchronizing load balancing state information across a plurality of service engines, the load balancing state information being associated with a connection, and the synchronizing of the load balancing state information including causing a distributed data store service to:
    determine in a distributed data store whether there is an existing entry that corresponds to the load balancing state information associated with the connection;
    in response to a determination that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection; and sending the load balancing state information to a leader selected among a cluster comprising the plurality of service engines; and distributing the connection to a selected server among a plurality of servers;

wherein:

the distributed data store includes a global data store; and the determining of whether in the distributed data store there is an existing entry that corresponds to the load balancing state information associated with the connection is made according to the leader; and in the event that there is no existing entry, the new entry is added to the global data store.

23. A computer program product for load balancing, the computer program product being embodied in a tangible non-transitory computer readable storage medium and comprising computer instructions for:

synchronizing load balancing state information across a plurality of service engines, the load balancing state information being associated with a connection, and the synchronizing of the load balancing state information including causing a distributed data store service to:

determine in a distributed data store whether there is an existing entry that corresponds to the load balancing state information associated with the connection;

in the event that there is no existing entry that corresponds to the load balancing state information associated with the connection, atomically create a new entry based on the load balancing state information, wherein to atomically create the new entry includes to prevent a conflict due to multiple contemporaneous attempts to create multiple new entries that corresponds to the same connection; and distributing the connection to a selected server among a plurality of servers;

wherein the plurality of service engines are configured to operate within a plurality of virtual machines executing on one or more physical devices; and a service engine among the plurality of service engines performs synchronizing the load balancing state information and distributing the connection to the selected server.

* * * * *